(12) United States Patent
Lee et al.

(10) Patent No.: US 6,603,096 B2
(45) Date of Patent: Aug. 5, 2003

(54) WELDING APPARATUS AND METHOD THEREOF FOR HERMETIC COMPRESSOR

(75) Inventors: In Gi Lee, Changwon (KR); Sun Han Lee, Changwon (KR)

(73) Assignee: LG Electronics Inc. (KR)

( * ) Notice: Subject to any disclaimer, the term of this patent is extended or adjusted under 35 U.S.C. 154(b) by 42 days.

(21) Appl. No.: 09/990,051

(22) Filed: Nov. 21, 2001

(65) Prior Publication Data

US 2002/0060217 A1 May 23, 2002

(30) Foreign Application Priority Data

Nov. 23, 2000 (KR) .................................... 2000-0069939

(51) Int. Cl.[7] ................................................ B23K 9/12
(52) U.S. Cl. ............................. 219/124.34; 219/125.11
(58) Field of Search ..................... 219/125.11, 125.1, 219/124.34; 228/48, 136; 901/42

(56) References Cited

U.S. PATENT DOCUMENTS

| 2,551,484 A | * | 5/1951 | Branning | ..................... 228/136 |
| 5,603,447 A | * | 2/1997 | Shalosky | ..................... 228/48 |
| 6,118,093 A | * | 9/2000 | Hong | .......................... 901/42 |

* cited by examiner

*Primary Examiner*—Clifford C. Shaw
(74) *Attorney, Agent, or Firm*—Ostrolenk, Faber, Gerb & Soffen, LLP

(57) ABSTRACT

In a welding apparatus and a method thereof for a hermetic compressor, a welding apparatus for a hermetic compressor includes a plurality of three welding torches placed at the circumference of a casing at regular intervals, a driving unit rotating the casing or the welding torches and a control means controlling a current and a voltage applied to the welding torches in accordance with welding conditions and the driving unit. Accordingly the welding apparatus and the method thereof for the hermetic compressor are capable of decreasing sharply a welding time and improving a productivity by installing not less than three welding torches.

11 Claims, 4 Drawing Sheets

WELDING APPARATUS AND METHOD THEREOF FOR HERMETIC COMPRESSOR

BACKGROUND OF THE INVENTION

1. Field of the Invention

The present invention relates to a welding apparatus and a method thereof for a hermetic compressor, and in particular to a welding apparatus and a method thereof for a hermetic compressor which are capable of decreasing a welding time and improving a welding quality.

2. Description of the Prior Art

FIG. 1 is a longitudinal sectional view illustrating a general hermetic compressor.

The general hermetic compressor includes a casing 11, a compressing unit 31 placed inside the casing 11 and compressing a refrigerant, and a driving unit 41 installed at the upper portion of the compressing unit 31 and operating the compression unit 31.

The driving unit 41 includes a stator 43 fixed at the inner circumference of the casing 11 and connected to a power source, a rotor 45 installed rotatable inside the stator 43, and a rotation shaft 47 fixed at the center of the stator 43 and transmitting a rotation force of the rotor 45 to the driving unit 41.

The compressing unit 31 includes a cylinder 33 forming a compressing chamber 49 in which the refrigerant is sucked and compressed, and a roller 35 fixed at the rotation shaft 47, placed inside the cylinder 33 so as to be eccentric and compressing the refrigerant while rotating inside the cylinder 33.

The casing 11 has a cylinder shape opened up and down, a suction pipe 13 sucking the refrigerant into the compressing chamber 49 is installed at the lower portion of the casing 11, and an upper cap 17 and a lower cap 15 are respectively combined at the opened upper and lower portions of the casing 11 in order to seal up the casing 11.

A discharge pipe 19 is installed at the upper cap 17 in order to discharge the refrigerant, and a plurality of power terminals 21 are installed at a certain portion of the upper cap 17 in order to supply power to the driving unit 41.

The plurality of power terminals 21 are supported by the upper cap 17 through a terminal supporting member 23 and surrounded by an insulating tube 25 so as to penetrate the terminal supporting member 23. And, the power terminal 21 is electrically connected to the stator 43 inside the casing 11 by a lead wire 27

Herein, the terminal supporting member 23 is made of a metal material, and the insulating tube 25 is made of a glass material for insulation.

In the meantime, the upper cap 17 and the lower cap 15 are permanently combined to the casing 11 by welding in order to prevent leakage of the refrigerant from the compressing unit 31.

In a method and an apparatus for welding the upper cap 17 and the lower cap 15 to the casing 11, a MIG (metal inert gas) welding apparatus or a MAG (metal active gas) welding apparatus generating and welding arc by continuously supplying an electrode wire and using argon (A) gas or argon+ helium (He) gas as an inert gas for protecting the arc is used.

FIG. 2 is a front view illustrating an arrangement of a welding torch of a welding apparatus of the conventional hermetic compressor.

In the conventional welding apparatus, a first welding torch 101 and a second welding torch 103 are placed at the circumference region of the casing 11 so as to be corresponded each other in the radius direction about the center of the casing 11 and a driving unit (not shown) rotating the casing 11 or the welding torches 101, 103 in welding.

In the conventional welding apparatus, an upper cap 17 and a lower cap 15 are respectively inserted into the upper and lower portions of the casing 11, the first and the second welding torches 101, 103 are at 180 degrees at the circumference of the casing 11 so as to be faced each other, when the driving unit is operated, the casing 11 or the welding torches 101, 103 is/are rotated, accordingly the electric welding can be performed through the first welding torch 101 and the second welding torch 103.

However, in the above-mentioned conventional welding apparatus, because the welding is performed by the two welding torches, the casing or the welding torch has to rotate in a 180-degrees arc at least, the welding time is increased, accordingly a productivity is lowered.

When a welding apparatus includes not less than three welding torches, heat generated in welding is excessively transmitted to the insulating tube through the upper cap and the insulation supporting member, accordingly crack can be occurred in the insulating tube as the glass material.

In addition, when welding stress occurs by the variation of a current and a voltage applied to each welding torch due to characteristics of the electric welding, because an additional means for coping with the situation is not included, accordingly lots of errors can occur.

SUMMARY OF THE INVENTION

In order to solve above-mentioned problems, it is an object of the present invention to provide a welding apparatus and a method thereof for a hermetic compressor which are capable of decreasing shapely a welding time and improving a productivity by installing not less than three welding torches.

In addition, it is another object of the present invention to provide a welding apparatus and a method thereof for a hermetic compressor which are capable of minimizing an error rate by lowering transmittance of heat generated in a welding torch to a power terminal by controlling the welding torch so as to pass the power terminal only one time.

In order to achieve the above-mentioned objects, a welding apparatus for a hermetic compressor includes a plurality of welding torches placed at the circumference of a casing at regular intervals, a driving unit rotating the casing or the welding torches and a control means controlling a current and a voltage applied to the welding torches according to welding conditions and the driving unit.

The hermetic compressor further includes a display unit displaying information about a detection result of the current and the voltage supplied to the welding torch and information about the welding state in real time.

The welding apparatus for the hermetic compressor includes three welding torches respectively placed at 180 degrees at the circumference of the casing 11 in which an upper cap is inserted.

Two of the three welding torches placed at both sides of a power terminal of the upper cap are installed at 60 degrees from the center of the power terminal.

The welding apparatus for the hermetic compressor includes four welding torches placed at 90 degrees at the circumference of the casing.

The driving unit rotates the welding torches or the casing.

The control means includes a power supply unit applying power to each welding torch, a current and voltage detecting unit detecting a current and a voltage applied to each welding torch, a welding condition setting unit setting a welding condition by including an upper limit of the current and the voltage applied to each welding torch, a heat input outputting unit outputting a heat input transmitted to the upper cap with the detecting result of the current and voltage detecting unit, and a control unit controlling the welding torch and the driving unit according to an electric signal of the heat input outputting unit and an electric signal applied from the welding condition wetting unit.

In order to achieve the above-mentioned object, a welding method for a hermetic compressor in accordance with the present invention includes a first step for setting a welding condition according to characteristics of a hermetic compressor and loading a casing having an inserted upper cap to a welding position, a second step for starting a welding by applying power to a welding torch, operating a driving unit and rotating the welding torch or the casing at a fixed speed when the casing is loaded to the welding position, a third step for detecting a current and a voltage applied to the welding torch and outputting a heat input transmitted from the welding torch to the upper cap in accordance with the detected electric signal when the welding is started in the second step, and a fourth step for stopping the loading of the hermetic compressor and cutting off power supply to the driving unit when the heat input transmitted to the upper cap is compared with a preset value and it is judged the former is larger than the latter in the third step.

The welding method for the hermetic compressor further includes displaying cut off of the power supply to the welding torch and the driving unit in an error occurrence.

In the welding method for the hermetic compressor, when the casing is loaded to the welding torch, the two welding torches are respectively placed at 60 degrees from the center of the power terminal installed at the upper cap.

DETAILED DESCRIPTION OF THE PREFERRED EMBODIMENT

Hereinafter, embodiments of a welding apparatus and a method thereof for a hermetic compressor in accordance with the present invention will be described with reference to accompanying drawings.

A plurality of embodiments of a welding apparatus and a method thereof for a hermetic compressor in accordance with the present invention can exist, hereinafter the preferred embodiments will be described.

Figure 3:
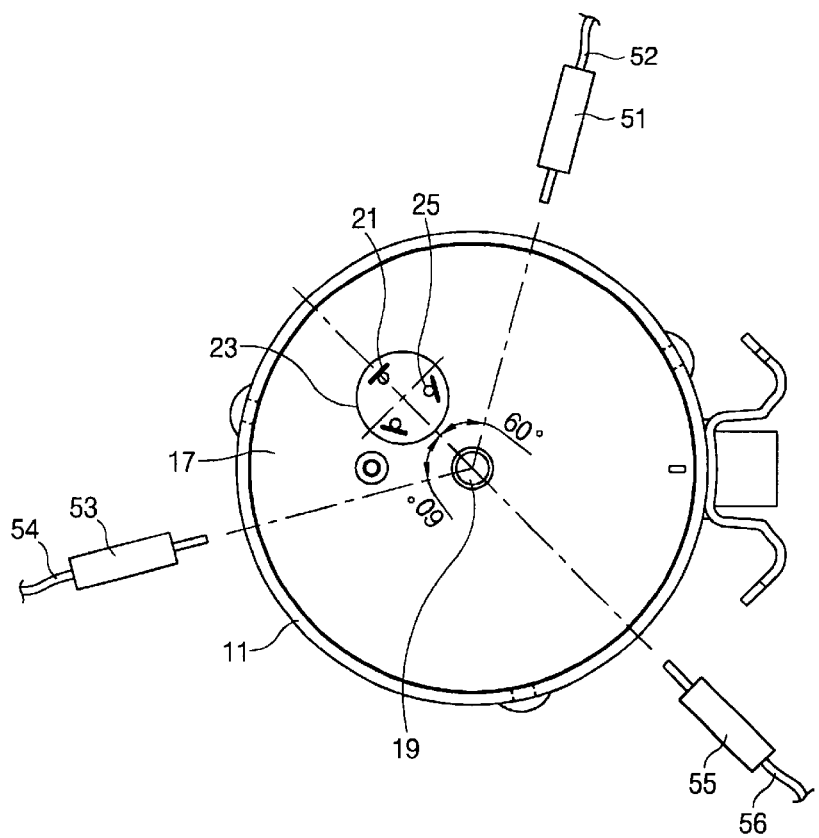
FIG. 3 is a block diagram illustrating arrangement of welding torches of a welding apparatus of a hermetic compressor in accordance with an embodiment of the present invention.
Figure 4:
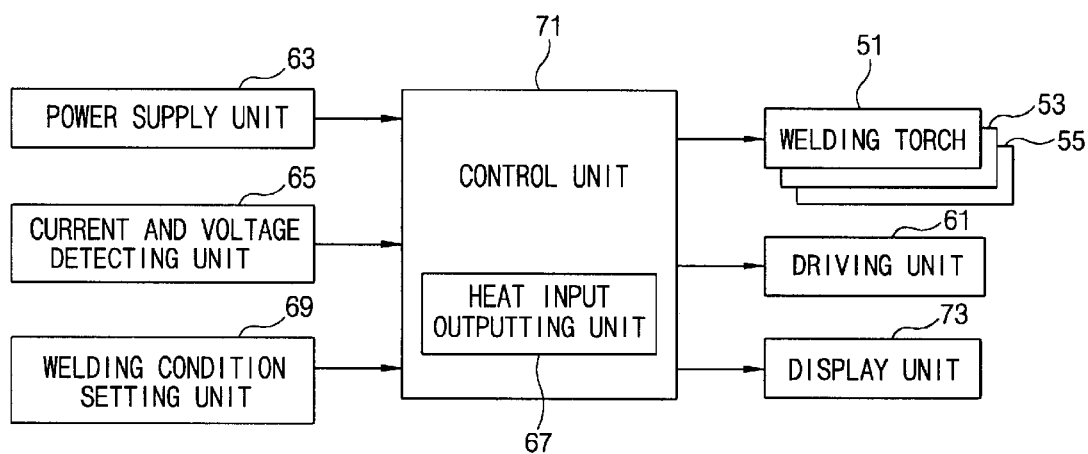
FIG. 4 is a plot plan illustrating a control unit of a welding apparatus for a hermetic compressor in accordance with the embodiment of the present invention.

FIG. 3 is a block diagram illustrating arrangement of welding torches of a welding apparatus for a hermetic compressor in accordance with an embodiment of the present invention, and FIG. 4 is a plot plan illustrating a control means of a hermetic compressor in accordance with the embodiment of the present invention.

Figure 1:
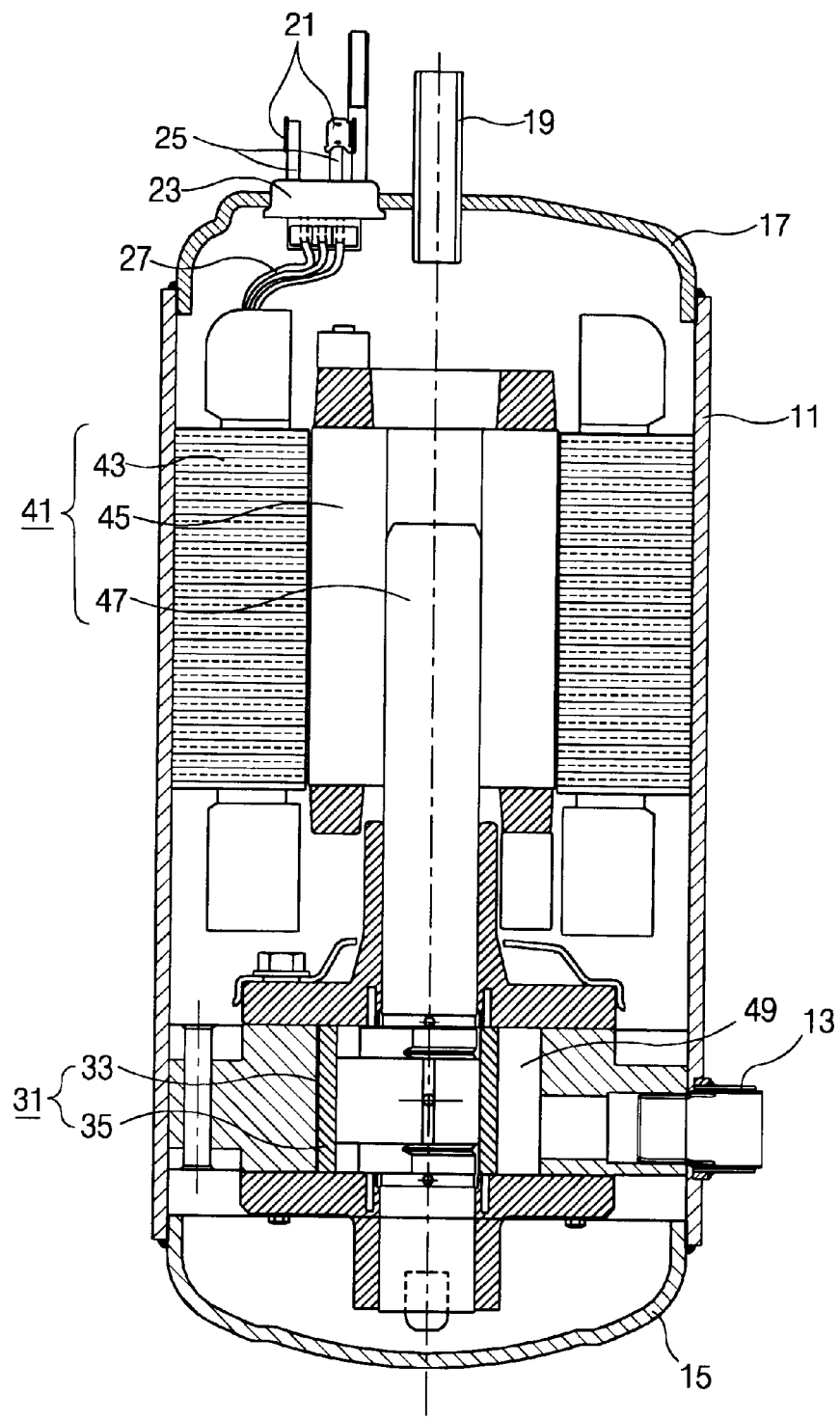
FIG. 1 is a longitudinal sectional view illustrating a general hermetic compressor.
Figure 2:
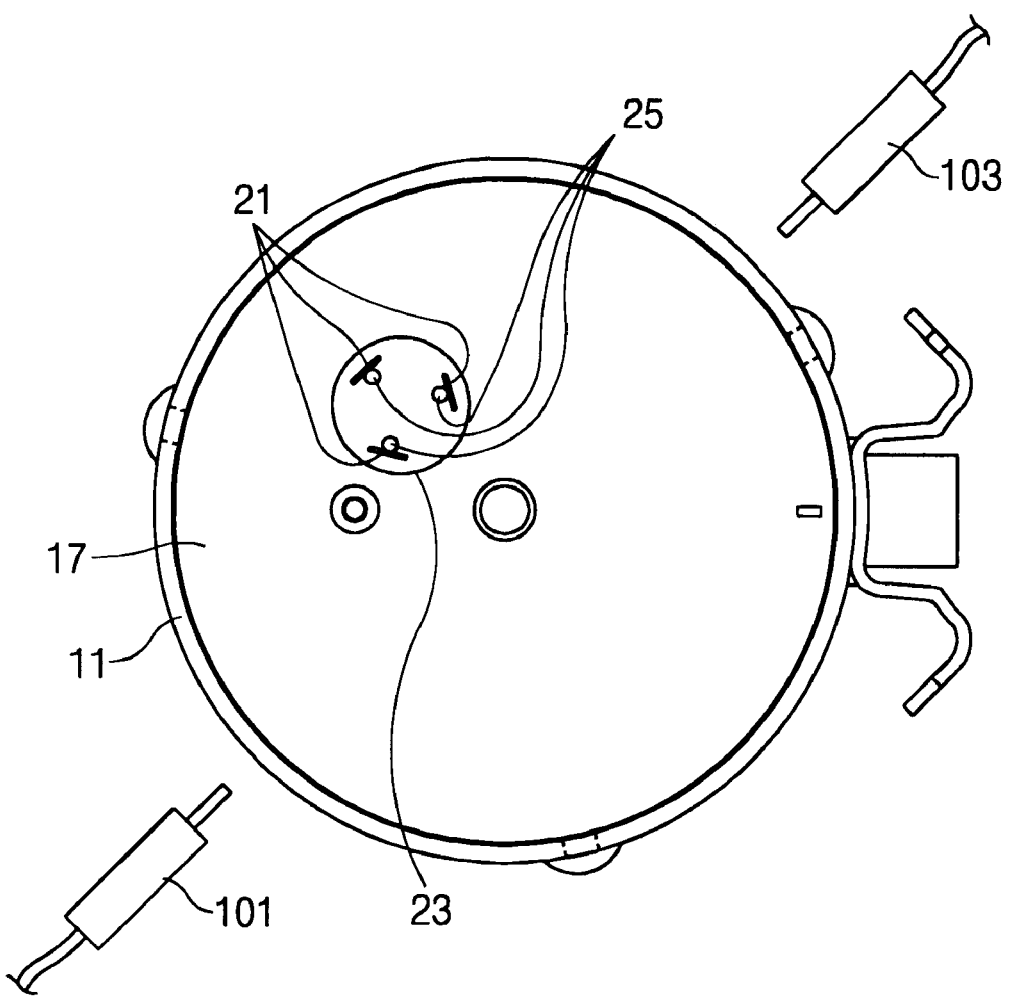
FIG. 2 is a plot plan illustrating arrangement of welding torches of a welding apparatus for a hermetic compressor in accordance with the prior art.

And, a structure of a general hermetic compressor will be described with reference to accompanying FIG. 1.

A welding apparatus for a hermetic compressor in accordance with the present invention includes three welding torches 51, 53, 55 placed at the circumference of a casing 11 at regular intervals, a driving unit (not shown) rotating a casing 11 or welding torches 51, 53, 55, and a control means, etc. controlling a current and a voltage applied to the welding torches 51, 53, 55 according to welding conditions and controlling the driving unit.

And, a display unit 73 is installed at the exterior of the casing 11 in order to display a detection result of the current and the voltage supplied to each welding torch 51, 53, 55 and cutting off the power supply to each welding torch 51, 53, 55.

The welding torches 51, 53, 55 are respectively installed at the circumference of the casing 11 at regular intervals, each cable 52, 54, 56 is connected to each welding torch 51, 53, 55 in order to supply power and an electrode wire (not shown).

And, two welding torches 51, 53 are placed so as to be corresponded to a connection line connecting the center of the casing 11 and the center of power terminals 21 installed at the upper cap 17. In more detail, the line connecting the center of the casing 11 and the center of the power terminals 21 is at 60 degrees from the line connecting the center of the casing 11 and the center of the welding torches 51, 53.

As described above, in order to minimize damage of the power terminals 21 by the heat generated in the welding torches 51, 53, the welding torches 51, 53 are corresponded to the connection line connecting the center of the casing 11 and the center of power terminals 21 installed at the upper cap 17.

In more detail, each welding torch 51, 53 rotates in a 120-degree arc in welding, in the above-mentioned arrangement of the welding torches, because only one welding torch can pass the power terminal, a heat input transmitted from the welding torch to the power terminal can be reduced. The driving unit 61 rotates the welding torches 51, 53, 55 or the casing 11 in accordance with a signal from the control unit 71 in welding, each welding torch 51, 53, 55 rotates in a 120-degree arc when the circumference surface between the casing 11 and the upper cap 17 is welded.

In more detail, the driving unit 61 rotates the welding torches 51, 53, 55 together in a 120-degree arc in welding after fixing the casing 11 or rotates the casing 11 in a 120-degree arc in welding after fixing the welding torches 51, 53, 55 at the circumference of the casing 11 in welding.

The control means includes a power supply unit 63 applying power to each welding torch 51, 53, 55, a current and voltage detecting unit 65 detecting a current and a voltage applied to each welding torch 51, 53, 55, a welding condition setting unit 69 setting welding conditions by including an upper limit of the current and the voltage applied to each welding torch 51, 53, 55, a heat input outputting unit 67 outputting a heat input transmitted to the upper cap 17 with the detection result from the current and voltage detecting unit 65, and a control unit 71 controlling the welding torches 51, 53, 55 and the driving unit 61 in accordance with the electric signal of the heat input outputting unit 67 and an electric signal applied form the welding condition setting unit 69.

And, the control unit 71 is electrically connected to the display unit 73 in order to display the detection result of the current and the voltage supplied to the welding torches and cut off of the power supply to the welding torches 51, 53, 55 on the display unit 71 in real time.

The operation of the welding apparatus for the hermetic compressor will be described.

First, a user sets welding conditions such as an upper limit of a current and a voltage, etc. according to characteristics of a compressor to be welded through the welding condition setting unit 69 and performs loading of the casing 11 including the inserted upper cap 17 at a welding position.

Herein, the control unit 71 makes the two welding torches 51, 53 respectively place at 60 degrees from the center of the power terminal 21.

And, the control unit 71 applies power to each welding torch 51, 53, 55 and operates the driving unit 61 by controlling the power supply unit 63. When the driving unit 61 is operated, welding is started by rotating the welding torches 51, 53, 55 or the casing 11 at a fixed speed.

Herein, the control unit 11 controls the rotation speed of the welding torches 51, 53, 55, the current and the voltage supplied from the power supply unit 63 to each welding torch 51, 53, 55 by judging welding conditions in accordance with a signal applied from the welding condition setting unit 69 and controlling the power applied to the driving unit 61.

As described above, when the welding is started, the current and voltage detecting unit 65 detects a current and a voltage applied to each welding torch 51, 53, 55 and applies the electric signal to the control unit 71, the heat input outputting unit 67 outputs the heat transmitted from the welding torches 51, 53, 55 to the upper cap 11 in accordance with the electric signal applied form the current and voltage detecting unit 65 and applies the heat input to the control unit 71.

Herein, the control unit 71 displays an upper limit of a current and a voltage applied to the welding torches 51, 53, 55 and the detection result on the display unit 73, accordingly the user can check the present state.

The control unit 71 compares the signal applied from the heat input outputting unit 67 with a preset value, when it is judged the preset value is larger than the heat input transmitted to the upper cap 17, after finishing the welding of the pertinent hermetic compressor, the control unit 71 stops loading of a next hermetic compressor to be welded, cuts off the power supply to each welding torches 51, 53, 55 and the driving unit 61 by controlling the power supply unit 63, accordingly it can prevent errors from arising.

And, the control unit 71 display the cut off of the power supply to the welding torches 51, 53, 55 and the driving unit 61 due to error occurrence on the display unit 73, accordingly the user can check the present state.

Figure 5:
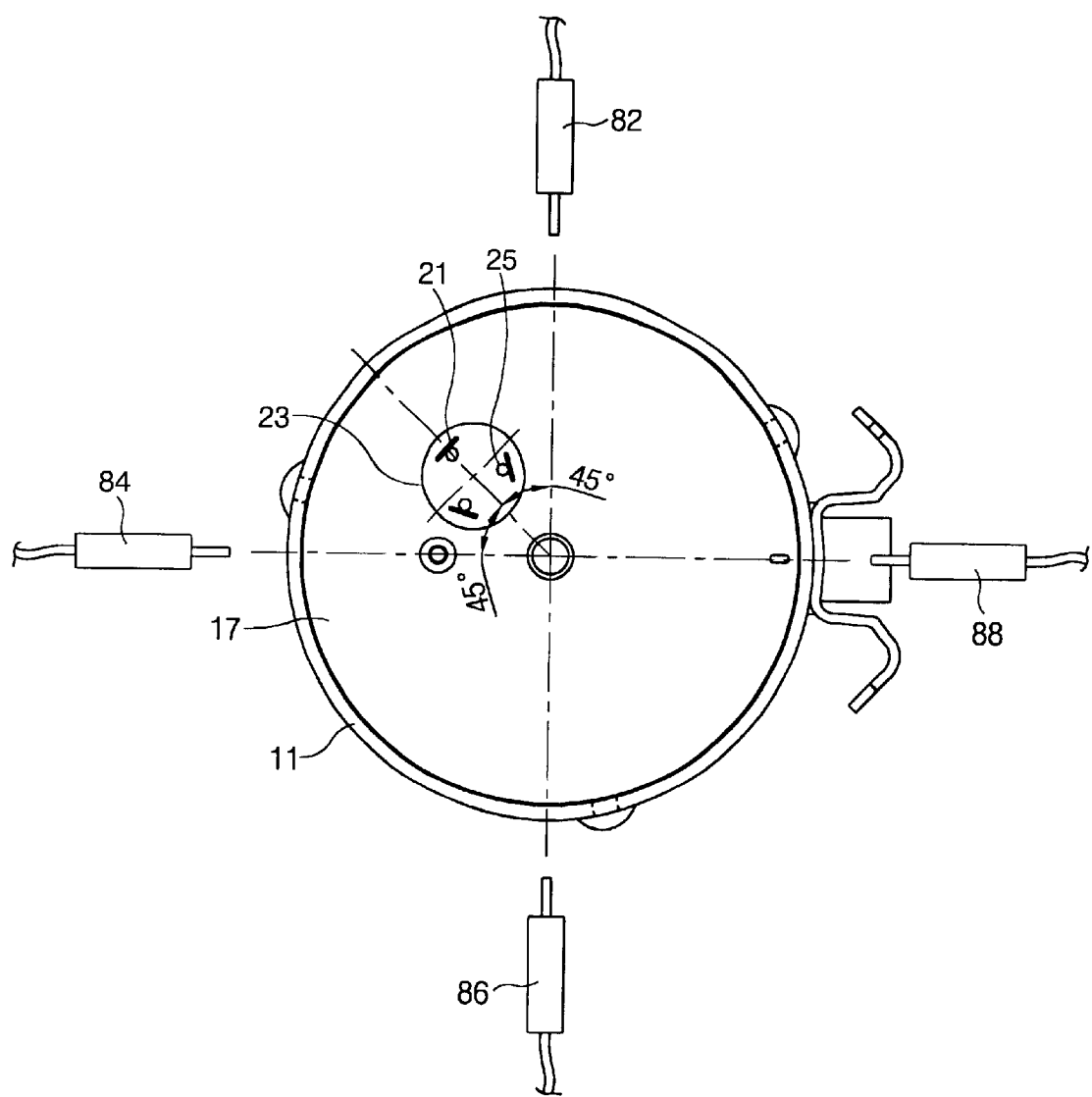
FIG. 5 is a plot plan illustrating welding torches of a welding apparatus for a hermetic compressor in accordance with another embodiment of the present invention.

FIG. 5 is a plot plan illustrating welding torches of a welding apparatus for a hermetic compressor in accordance with another embodiment of the present invention.

A welding apparatus for a hermetic compressor in accordance with another embodiment of the present invention includes four welding torches 82, 84, 86, 88 placed at the circumference of the casing 11 at regular intervals, a driving unit 61 rotating the casing 11 or the welding torches 82, 84, 86, 88, and a control means controlling a current and a voltage applied to the welding torches in accordance with welding conditions and controlling the driving unit 61.

Herein, the construction and the operation of the driving unit 61 and the control means are same with the driving unit and the control means of the above-mentioned embodiment, accordingly explanation about driving unit 61 and the control means will be abridged.

The welding torches 82, 84, 86, 88 are installed at the circumference of the casing 11 at 90 degrees from each other, two welding torches 82, 84 adjacent to the power terminal 21 are respectively placed at 45 degrees from the center of the power terminal 21.

In the welding apparatus for the hermetic compressor in accordance with another embodiment of the present invention, because the welding can be finished by rotating the casing 11 or the welding torches 82, 84, 86, 88 in a 90-degree arc by the operation of the driving unit 61, a welding time can be decreased, and because only one welding torch passes the power terminal 21 in welding, deterioration of the power terminal can be reduced.

In the welding apparatus and the method thereof for the hermetic compressor in accordance with the present invention, because three welding torches are installed at the circumference of the casing and the casing or the welding torches rotate not greater than in a 120-degree arc in welding, a welding time can be decreased, accordingly a productivity can be improved.

In addition, because two welding torches at both sides of the power terminal installed at the upper cap are respectively placed at 60 degrees from the center of the power terminal, the welding torch passes the power terminal side only once in welding, accordingly heat transmission from the welding torch to the power terminal can be minimized and an error rate can be minimized also.

In addition, in the welding apparatus and the method thereof for the hermetic compressor in accordance with the present invention, when a heat input from the welding torch to the power terminal is detected and the heat input is not less than a preset value, the operation of the welding apparatus is stopped, accordingly it is possible to prevent an error from arising and a reliability and a productivity can be improved.

What is claimed is:

1. A welding apparatus for a hermetic compressor, comprising:
   at least three welding torches placed at the circumference of a casing at regular intervals;
   a driving unit rotating the casing or the welding torches; and
   a control means controlling a current and a voltage applied to the welding torches in accordance with welding conditions and controlling the driving unit.

2. The apparatus of claim 1, further comprising:
   a display unit displaying the detection result of the current and the voltage supplied to the welding torches and information about a welding state in real time.

3. The apparatus of claim 1, wherein the three welding torches are respectively placed at 120 degrees from each other at the circumference of the casing in which an upper cap is inserted.

4. The apparatus of claim 3, wherein two of the three welding torches placed at both sides of a power terminal of the upper cap are respectively installed at 60 degrees from the center of the power terminal.

5. The apparatus of claim 1, wherein four welding torches are respectively installed at 90 degrees from each other at the circumference of the casing in which the upper cap is inserted.

6. The apparatus of claim 5, wherein two of the four welding torches placed at both sides of the power terminal of the upper cap are respectively installed at 45 degrees from the center of the power terminal.

7. The apparatus of claim 1, wherein the driving unit rotates the welding torches or the casing.

8. The apparatus of claim 1, wherein the control means includes:
   a power supply unit applying power to each welding torch;
   a current and voltage detecting unit detecting a current and a voltage applied to each welding torch;
   a welding condition setting unit setting a welding condition by including an upper limit of a current and a voltage applied to each welding torch;
   a heat input outputting unit outputting a heat input transmitted to the upper cap with the detection result of the current and voltage detecting unit; and
   a control unit controlling the welding torches and the driving unit according to an electric signal from the heat input outputting unit and an electric signal applied from the welding condition setting unit.

9. A welding method for a hermetic compressor, comprising:
   a first step for setting a welding condition according to characteristics of a hermetic compressor and loading a casing having an inserted upper cap to a welding position;
   a second step for starting a welding by applying power to welding torches, operating a driving unit and rotating the welding torches or the casing at a fixed speed when the casing is loaded to the welding position;
   a third step for detecting a current and a voltage applied to the welding torch and outputting a heat input transmitted from the welding torch to the upper cap in accordance with the detected electric signal when the welding is started in the second step; and
   a fourth step for stopping the loading of the hermetic compressor and cutting off power supply to the driving unit when the heat input transmitted to the upper cap is compared with a preset value and it is judged the heat input is larger than the preset value in the third step.

10. The method of claim 9, further comprising:
    displaying cut off of the power supply to the welding torch and the driving unit on a display unit in an error occurrence.

11. The method of claim 9, wherein the two welding torches are respectively placed at 60 degrees from the center of the power terminal installed at the upper cap when the casing is loaded to the welding torch in the first step.

* * * * *